United States Patent
Eckardt et al.

(10) Patent No.: US 9,506,595 B2
(45) Date of Patent: Nov. 29, 2016

(54) FLUID LINE

(75) Inventors: Carsten Eckardt, Bruchkoebel (DE); Stephan Mann, Biebergemuend (DE); Marc Rastetter, Biebergemuend (DE); Cameron Read, Hanau (DE); Knut Seibel, Altenstadt (DE)

(73) Assignee: NORMA GERMANY GMBH, Maintal (DE)

( * ) Notice: Subject to any disclaimer, the term of this patent is extended or adjusted under 35 U.S.C. 154(b) by 834 days.

(21) Appl. No.: 13/461,240

(22) Filed: May 1, 2012

(65) Prior Publication Data

US 2012/0291904 A1  Nov. 22, 2012

(30) Foreign Application Priority Data

May 20, 2011 (DE) .......... 10 2011 102 151

(51) Int. Cl.
*F16L 53/00* (2006.01)

(52) U.S. Cl.
CPC ............ *F16L 53/008* (2013.01); *F16L 53/001* (2013.01); *F01N 2610/10* (2013.01); *F01N 2610/14* (2013.01)

(58) Field of Classification Search
CPC ..... F16L 53/001; F16L 53/008; F24H 1/009; F01N 2610/10; F01N 2610/105
See application file for complete search history.

(56) References Cited

U.S. PATENT DOCUMENTS

| | | | |
|---|---|---|---|
| 1,905,733 A | 4/1933 | Moore | |
| 2,141,797 A | 12/1938 | Minella | |
| 3,894,302 A | 7/1975 | Lasater | |
| 5,182,792 A | 1/1993 | Goncalves | |
| 5,930,459 A * | 7/1999 | Eckman et al. | 392/503 |
| 6,944,394 B2 | 9/2005 | Long et al. | |
| 7,991,273 B2 | 8/2011 | Sonderegger et al. | |
| 2005/0016757 A1 | 1/2005 | Schwamborn et al. | |
| 2006/0252292 A1 | 11/2006 | Sonderegger et al. | |
| 2009/0034949 A1 | 2/2009 | Sawada et al. | |
| 2010/0193530 A1* | 8/2010 | Leonard et al. | 220/694 |

FOREIGN PATENT DOCUMENTS

| | | |
|---|---|---|
| CN | 1926372 | 3/2007 |
| CN | 101346575 | 1/2009 |
| CN | 101606014 | 12/2009 |
| CN | 201680154 | 12/2010 |
| DE | 34 14 284 | 10/1985 |
| DE | 202008003270 | 10/2009 |
| EP | 0 068 688 | 1/1983 |
| EP | 1 070 642 | 1/2001 |
| EP | 1070642 | 1/2001 |
| EP | 1070642 A2 | 1/2001 |

(Continued)

OTHER PUBLICATIONS

Chinese Office Action in related application No. 201210141697.5, dated Jan. 27, 2014 (with partial English-language translation).

(Continued)

*Primary Examiner* — Kevin Murphy
(74) *Attorney, Agent, or Firm* — Greenblum & Bernstein, P.L.C.

(57) ABSTRACT

A fluid line including a pipe, a connector having a pipe connection, which is arranged on one end of the pipe, and an opening, and a heater arranged in an interior of the pipe. The heater includes a heater rod arranged to extend from the pipe into the pipe connection of the connector and out of the connector through the opening.

16 Claims, 2 Drawing Sheets

(56) References Cited

FOREIGN PATENT DOCUMENTS

| EP | 1484945 | 12/2004 |
|---|---|---|
| FR | 2924786 | 6/2009 |
| GB | 2100559 A | 12/1982 |
| JP | S 582463 | 1/1983 |
| JP | S 60180982 | 11/1985 |
| JP | H 0579593 | 3/1993 |
| JP | 2010-501799 | 1/2010 |
| RU | 2342807 | 4/2006 |
| WO | 2007/073286 | 6/2007 |
| WO | WO2008/023021 | 2/2008 |

OTHER PUBLICATIONS

Japanese Office Action in related application No. 2012-112357, dated Aug. 27, 2013 (with partial English-language translation).
Korean Office Action in related application No. 10-2012-51104, dated Sep. 17, 2013 (with partial English-language translation).
Chinese Office action in related application No. 201210141654.7, dated Dec. 4, 2013, along with English-language translation thereof.
Korean Office action in counterpart application No. 10-2012-0051105, dated Sep. 17, 2013, along with a partial english translation thereof.
Japanese Office action in counterpart application No. 2012-112358, dated Aug. 27, 2013, along with a partial english translation thereof.
Korean Office Action in related application No. 10-2012-0051103, dated Feb. 14, 2014 (with English-language translation).
Russian OA in related application No. 2012120423/06 dated Feb. 26, 2013 (with partial English-language translation).
Russian OA in related application No. 2012120423/06 dated May 30, 2013 (with partial English-language translation).
Japanese Office Action in related application No. 2012-112360, dated Aug. 27, 2013 (with partial English-language translation).
Korean Office Action in related application No. 10-2012-0051103, dated Sep. 17, 2013 (with partial English-language translation).
E.P.O. Search report in related Application No. 12001338.8 (with partial English language translation); mail date is Oct. 26, 2012.
E.P.O.Search report in related Application No. 12001339.6 (with partial English-language translation); mail date is Oct. 26, 2012.
German Office Action in related Application No. 102001102244.2 (with partial English-language translation); mail date is May 15, 2012.
E.P.O. Search report in related Application No. 12001337.0 (with partial English-language translation); mail date is Oct. 10, 2012.
Chinese Office Action in related application No. 201210124052.0, dated Dec. 25, 2013 (with partial English-language translation).
German Office Action in related application No. 102011102151.9, dated Oct. 12, 2015.
German Office Action in related application No. 10-2011 102 148.9, dated Oct. 13, 2015.

* cited by examiner

FLUID LINE

CROSS-REFERENCE TO RELATED APPLICATIONS

The present application claims priority under 35 U.S.C. §119 of German Patent Application No. 10 2011 102 151.9, filed on May 20, 2011, the disclosure of which is expressly incorporated by reference herein in its entirety.

BACKGROUND OF THE INVENTION

1. Field of the Invention

The invention relates to a fluid line with a pipe, a connector, which has a pipe connection and which is arranged on one end of the pipe, and a heater, which is arranged in the interior of the pipe.

2. Discussion of Background Information

The invention is described below based on a fluid line which is used in a motor vehicle to guide urea from a tank to a consumption point, for example, a pump. Urea is used with diesel engines in order to reduce the nitrogen oxides.

In the case of low outdoor temperatures of below −11° C. there is a danger that the urea will freeze in the fluid line and thus a conveyance of the urea through the line is no longer possible. In the case of other liquids, the freezing points can have different values. If the liquid freezes, in any case a transport of the liquid through the fluid line is no longer possible.

It has therefore been proposed to heat the fluid line and optionally the connector as well. One way of doing this is to wind a heating wire around the pipe and around the connector which, when it is loaded with a corresponding current strength, generates heat that can be transmitted through the pipe to the liquid located in the interior of the pipe. However, an embodiment of this type has the disadvantage that the heater is exposed to the risk of damage due to external influences. Furthermore, most of the heat generated by the heater is not transmitted to the liquid in the interior of the pipe, but is irradiated to the outside.

Another suggestion is to embody a heating conductor in a flat manner and to shape it in a helical manner and then to arrange it in the interior of the pipe. Although a relatively large surface is available here for the heat transfer from the heater to the liquid, a flat heating conductor is very sensitive and can already be damaged during assembly. Furthermore, it is relatively difficult to bring the electric power that is required for generating the heat to the heating conductor.

SUMMARY OF THE INVENTION

An aim of the invention is to provide a fluid line which can be reliably heated in operation.

This aim is attained with a fluid line of the type mentioned at the outset in that the heater is embodied as a heater rod, which is guided out of the pipe into the pipe connection of the connector and is guided out of the connector through an opening.

The embodiment as a heater rod gives the heater a certain mechanical stability and loadability. Accordingly, the risk that the heater will be damaged during the insertion into the pipe and into the connector, is relatively low. Because the heater rod is guided out of the pipe into the pipe connection of the connector, it is possible to heat the liquid not only in the pipe, but also in the part of the connector in which the heater rod is arranged. The term "pipe" is not limited to rigid pipes here. It can also cover a hose or another line that can be shaped or bent. Since the heater rod is guided out of the connector through an opening, it is possible to produce the electrical connections outside the connector. These connections are thus relatively easily accessed from outside and can be monitored after production and in the installed condition. The production of the fluid line is thus relatively simple.

Preferably, the heater rod has a plastic molding compound into which at least one heating conductor is embedded. The plastic can be extruded, for example, wherein the heating conductor is also inserted into the plastic molding compound during the extrusion. When the plastic molding compound has then hardened, the heating conductor is accommodated in the interior of the heater rod and protected from outside influences by the plastic molding compound. Of course, the plastic molding compound must be resistant to the liquid flowing in the fluid line.

Preferably, the heater rod is embodied in a bendable manner. It can therefore also follow a fluid line which has one or more changes of direction. Due to the bending property of the heater rod, the heater rod does not also need to be embodied with the same course as the fluid line from the start. Instead the heater rod can be inserted from one end of the fluid line and due to its bending property can be guided completely through the pipe.

Preferably, the opening is sealed by a ring seal, which bears against the heater rod. For example, a ring seal can be formed by an O-ring of an elastomeric material. The sealing of the opening by the ring seal prevents fluid from leaking out of the fluid line where the heater rod is guided out of the connector.

Preferably, the seal is placed against the connector from outside. This facilitates handling. Firstly, the heater rod can be inserted into the connector and allowed to emerge through the opening. When the heater rod has emerged far enough out of the opening so that connections or the like can be produced here, the seal is placed onto the heater rod and guided along the heater rod up to the opening on the connector. When the seal bears against the heater rod as well as against the connector, a fluid-tight opening has been created.

Preferably a plug is provided, which holds the ring seal in the connector. Usually a somewhat increased pressure prevails in the interior of the fluid line. There is a danger here that without additional measures this pressure will press the ring seal out of the opening, which would lead to a leak. The use of a plug is a relatively simple measure to hold the ring seal at the desired location.

Preferably, the plug is arranged in a pipe connection through which the heater rod is guided out of the connector to the outside. The pipe connection is embodied, for example, in a cylindrical manner and has a certain length so that the plug can be inserted here and is fixed with sufficient force.

Preferably, the plug is locked to the connector. A form closure results from the locking, which holds the plug in the connector and thus is able to withstand even larger pressures acting on the ring seal.

Preferably, the plug is provided on its free front face with at least one groove. This groove can be used, for example, to guide an electric conductor that leads to the heater rod. The electric conductor is thus in any case partially protected by the plug against mechanical damage just before the connection with the heater rod.

Preferably, the groove runs radially and opens into a circumferential wall of the plug outside a locking geometry serving to lock the plug to the connector. The groove and a conductor possibly located therein thus does not interfere with the locking of the plug to the connector. However, the plug can be used in order to protect the electric conductor.

Preferably, the plug delimits a sealing space, which has an extension in a direction parallel to the heater rod, which extension corresponds at least to the thickness of the ring seal in this direction. The ring seal is thus not pressed by the plug. The plug has a purely holding function. A change of shape of the ring seal can take place at most by the pressure prevailing in the interior of the fluid line, which pressure then presses the ring seal against the plug. When the ring seal is compressed parallel to the longitudinal extension of the heating conductor, it bears more closely inwards against the heating conductor and outwards against the inner wall of the pipe connection.

Aspects of the disclosure are directed to a fluid line comprising a pipe, a connector having a pipe connection, which is arranged on one end of the pipe, and an opening, and a heater arranged in an interior of the pipe. The heater comprises a heater rod arranged to extend from the pipe into the pipe connection of the connector and out of the connector through the opening.

In embodiments, the heater rod comprises: a plastic molding compound, and at least one heating conductor. The least one heating conductor is embedded in the plastic molding compound.

In further embodiments, the heater rod is embodied in a bendable manner.

In additional embodiments, the fluid line further comprises a ring seal arranged to seal the opening and to bear against the heater rod.

In yet further embodiments, the connector is structured and arranged such that the ring seal is positionable against the connector from an outside of the connector.

In embodiments, the fluid line further comprises a plug, which is structured and arranged to hold the ring seal in the connector.

In further embodiments, the plug is arranged along a longitudinal axis of the pipe connection.

In additional embodiments, the plug is structured and arranged to be locked to the connector.

In yet further embodiments, the plug comprises a front face having at least one groove.

In embodiments, the plug further comprises: a circumferential wall, and a locking geometry structured and arranged to lock the plug to the connector. The at least one groove runs radially and opens into the circumferential wall of the plug outside the locking geometry.

In further embodiments, the connector further comprises a sealing space having an extension in a direction parallel to a longitudinal axis of the heater rod within the sealing space, which is delimited by a wall of the connector and the plug. The extension corresponds to at least a thickness of the ring seal in the direction parallel to the longitudinal axis of the heater rod within the sealing space.

Additional aspects of the disclosure are directed to a method of assembling a fluid line having a pipe, a connector having a pipe connection, which is arranged on one end of the pipe, and an opening, and a heater arranged in an interior of the pipe, wherein the heater comprises a heater rod. The method comprises guiding the heating rod out of the pipe and into the pipe connection of the connector, and further guiding the heating rod out of the connector through the opening.

In further embodiments, the heater rod comprises at least one heating conductor embedded in a plastic molding compound to be bendable.

In yet further embodiments, the fluid line further comprises a ring seal, and the method further comprises sealing the opening with the ring seal, which bears against the heater rod.

In embodiments, the method further comprises positioning the ring seal against the connector from an outside of the connector.

In further embodiments, the fluid line further comprises a plug, and the method further comprises inserting the plug into the connector to hold the ring seal.

In additional embodiments, the plug is arranged along a longitudinal axis of the pipe connection.

In yet further embodiments, the method further comprises locking the plug to the connector.

In embodiments, the plug comprises a front face having at least one groove.

In yet further embodiments, the plug further comprises a circumferential wall and a locking geometry structured and arranged to lock the plug to the connector. The at least one groove runs radially and opens into the circumferential wall of the plug outside the locking geometry.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
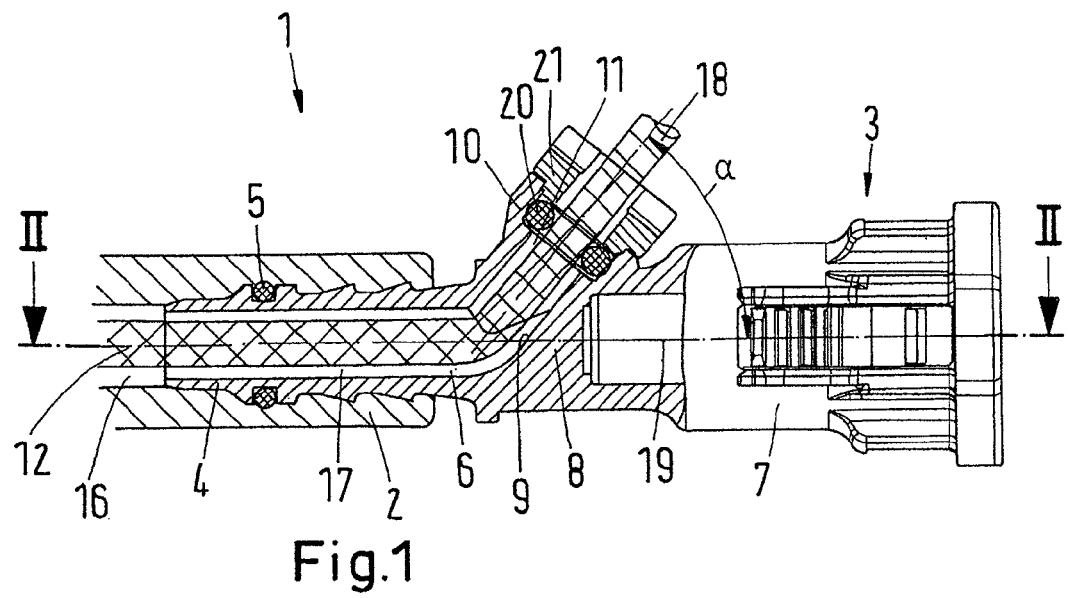
FIG. 1 illustrates a first exemplary embodiment of a fluid line with a connector.

FIG. 1 shows a fluid line 1 with a pipe 2 and a connector 3, which has a pipe connection 4 onto which the pipe 2 is pushed. The pipe 2 can be attached to the pipe connection 4 by a clamp (not shown in further detail), for example, with a hose clamp. The pipe connection 4 has a "pine tree" geometry. In addition, a sealing ring 5 can be provided between the pipe 2 and the pipe connection 4.

The pipe 2 is made of a plastic. The pipe 2 is flexible. It can also be embodied as a hose-like line.

The connector 3 has a through-channel 6 running in a straight-line manner, which passes through the pipe connection 4 and is guided up to a connection geometry 7, which can be used to attach to a pipe connection of a tank, a pump or another connector. The precise embodiment of the connection geometry 7 is irrelevant to the present case. However, it is embodied such that it can render possible a mechanically stable and fluid-tight connection.

A ramp element 8, arranged in the through-channel 6, has a guide surface 9 for the purposes described below.

The connector 3 has a pipe connection 10, which forms an opening 11.

Figure 6:
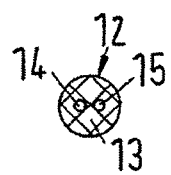
FIG. 6 illustrates a section through a heater rod.

A heater in the form of a heater rod 12 is arranged in the pipe 2. The heater rod 12, as can be seen in FIG. 6, is made of a plastic 13, in which two heating conductors 14, 15 are arranged. The heater rod 12 is bendable. The heating conductors 14, 15 are accommodated in the interior of the heater rod 12 in a mechanically protected manner.

An annular space 16 is formed between the heater rod 12 and the pipe 2, through which a liquid can flow. An annular space 17 is also formed between the pipe connection 4 and the heater rod 12. The annular space 17 has a somewhat smaller cross-sectional surface than the annular space 16 between the heater rod 12 and the pipe 2. However, this smaller cross-sectional surface is still sufficient to allow a sufficient quantity of liquid to flow through the fluid line 1. The smaller volume associated with the smaller cross section, however, has the advantage that here also only a smaller quantity of liquid can freeze, so that a thawing operation (with the same heat supply) can take place more quickly than with a larger volume to be thawed. Furthermore, a smaller liquid volume can undergo only a lower increase in volume during freezing so that the stress on the connector 3 during the freezing of the liquid can be kept lower.

When the heater rod is inserted into the pipe connection 4, the tip 18 of the heater rod reaches the guide surface 9 and is deflected by the guide surface 9 of the ramp element 8, namely into the pipe connection 10 towards the opening 11. When the heater rod 12 is pushed further, it emerges through the opening 11 out of the pipe connection 10, as shown. The pipe connection 10 is at an angle $\alpha$ to the longitudinal axis 19 of the through-channel 6. This angle is preferably in the range of 20° to 80°.

A ring seal 20 is arranged in the opening 11 between the inner wall of the pipe connection 10 and the heating conductor 12. The ring seal 20 bears (radially outwards) against the inside of the pipe connection 10 in a sealing manner and (radially inwards) against the heating conductor 12 in a sealing manner. The ring seal 20 is placed onto the heater rod 12 when it has emerged out of the opening 11 and then inserted into the opening 11. The ring seal 20 can thereby be compressed slightly radially inwards and radially outwards.

An increased pressure of 6 bar, for example, can occur in the interior of the fluid line 1. With a pressure of this type there is a danger that the ring seal 20 will be pressed out of the opening 11. In order to prevent this, a plug 21 is inserted into the pipe connection 10, which plug holds the ring seal 20 in the connector 3. The plug 21 is shown in an enlarged manner in FIG. 3. The plug 21 has two latches 22 (only one is discernible) lying diametrically opposite one another on its radial outside. These latches 22 can enter corresponding latch recesses on the pipe connection 10 (not shown) so that the plug 21 is held in the pipe connection 10 in a positive manner. Expediently, the latches 22 have tapering approach surfaces 23 for this purpose.

On its axial outside 24, that is, the side through which the heater rod 18 passes to the outside, the plug 21 has two grooves 25, 26 running radially, through which, for example, electrical connections for the heater rod 12 can be guided. These grooves 25, 26 open outside a locking geometry serving to lock the plug 21 to the connector 3, namely the latches 22, in the circumferential wall of the plug 21. Thus when connecting wires are guided out, they do not interfere with the attachment of the plug 21 in the pipe connection 10 of the connector 3.

The plug 21 does not compress the ring seal 20. Thus a sealing space is provided for the ring seal 20 which in any case has an extension in a direction parallel to the longitudinal extension of the heater rod 12, which corresponds at least to the thickness of the ring seal 20 in this direction. The plug 21 thus has only the function of holding the ring seal 20 in place.

However, the ring seal 20 is embodied such that it tends to expand radially inwards and outwards when it is acted on axially with a pressure. Thus, when the pressure in the interior of the fluid line 1 increases, the ring seal 20 is pressed against the plug 21 and, due to the expansion associated therewith, bears radially inwards and radially outwards with a greater force against the inside of the pipe connection 10 and against the outside of the heater rod 12. The tightness of the fluid line is also maintained in the region of the connector 3 and above all in the region of the opening 11, through which the heater rod 12 is guided outwards.

Figure 3:
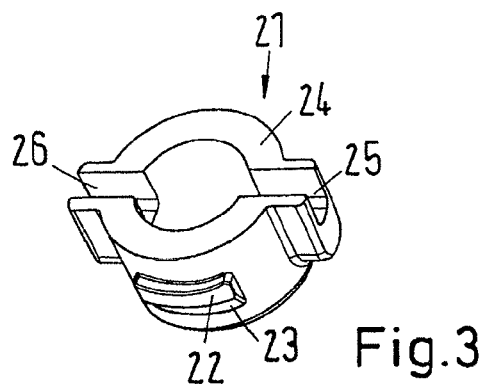
FIG. 3 illustrates a plug in perspective enlarged representation.
Figure 4:
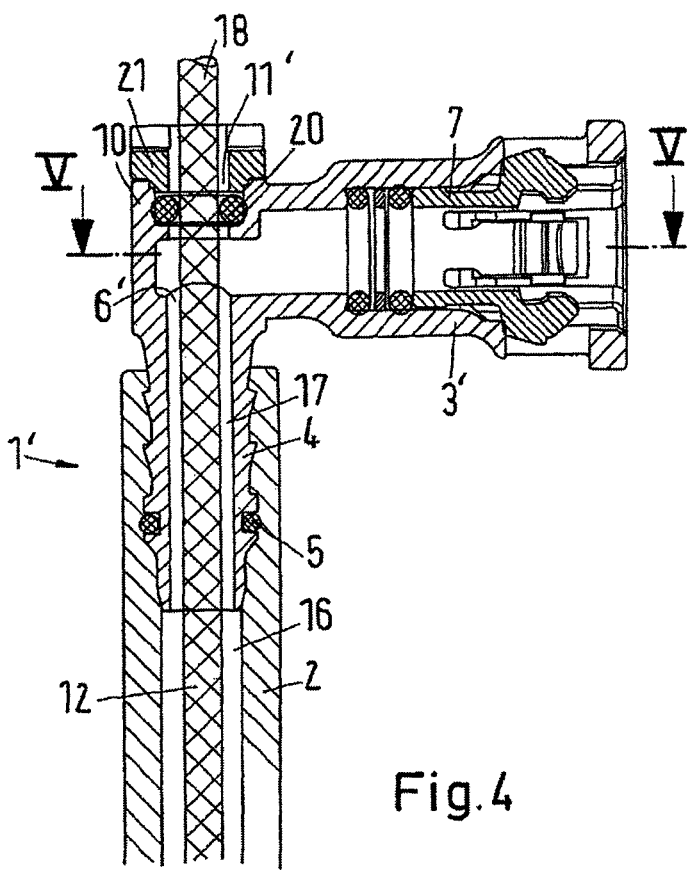
FIG. 4 illustrates a second embodiment of a fluid line with a modified shape of a connector.
Figure 5:
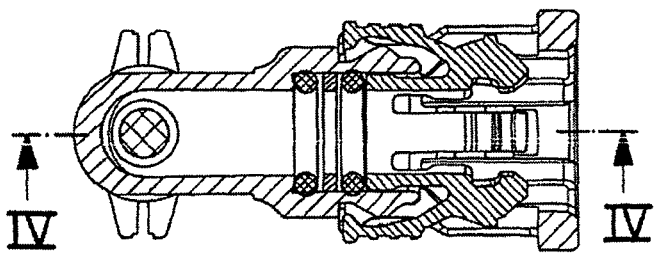
FIG. 5 illustrates a section IV-IV according to FIG. 4.

FIGS. 4 and 5 show a modified embodiment, wherein FIG. 5 shows a section V-V according to FIG. 4 and FIG. 4 shows a section IV-IV according to FIG. 5. Identical and functionally identical elements as in FIGS. 1 through 3 are provided with the same reference numbers.

Figure 2:
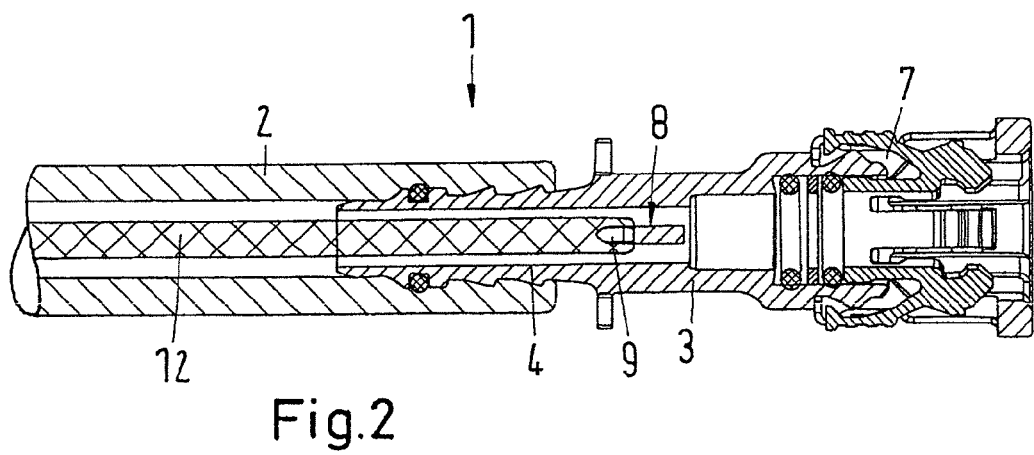
FIG. 2 illustrates a section II-II according to FIG. 1.

While in the embodiment according to FIGS. 1 and 2 the through-channel 6 has an elongated shape (which also is referred to as a 0° passageway), in FIGS. 4 and 5 the through-channel 6' is angled, i.e. it has a 90° deflection.

Accordingly, it is possible here to guide the heater rod 12 in a straight line through the connector 3', so that it enters through the pipe connection 4 and can exit through the opening 11' in a straight line without it having to be deflected by some further arrangement.

Here too a ring seal 20 is arranged in the pipe connection 10, which ring seal is pushed onto the heater rod 12 and sits with a certain preloading between the pipe connection 10 and the heater rod 12. This ring seal 20 is also held by the plug 21 in the pipe connection 10. Here the same plug 21 can be used as in the embodiment according to FIGS. 1 and 2.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A fluid line comprising:
   a pipe;
   a connector having a pipe connection, which is arranged on one end of the pipe, and an opening;
   a heater arranged in an interior of the pipe, wherein the heater comprises a heater rod arranged to extend from the pipe into the pipe connection of the connector and out of the connector through the opening;
   a ring seal structured and arranged to seal the opening and to bear against the heater rod, and
   a plug, arranged in the connector, which is structured and arranged to hold the ring seal in the connector, wherein the plug comprises:
      a front face having at least one groove, through which at least one electrical connection for the heater rod can be guided; and
      a circumferential wall, wherein the at least one groove runs radially and opens into the circumferential wall of the plug.

2. The fluid line according to claim 1, wherein the heater rod comprises:
   a plastic molding compound; and
   at least one heating conductor,
   wherein the at least one heating conductor is embedded in the plastic molding compound.

3. The fluid line according to claim 1, wherein the heater rod is embodied in a bendable manner.

4. The fluid line according to claim 1, wherein the connector is structured and arranged such that the ring seal is positionable against the connector from an outside of the connector.

5. The fluid line according to claim 1, wherein the plug is arranged along a longitudinal axis of the pipe connection.

6. The fluid line according to claim 1, wherein the plug is structured and arranged to be locked to the connector.

7. The fluid line according to claim 1, wherein the plug further comprises:
   a locking geometry structured and arranged to lock the plug to the connector,
   wherein the at least one groove opens into the circumferential wall of the plug outside the locking geometry.

8. The fluid line according to claim 1, wherein the connector further comprises a sealing space having an extension in a direction parallel to a longitudinal axis of the heater rod within the sealing space, which is delimited by a wall of the connector and the plug, wherein the extension corresponds to at least a thickness of the ring seal in the direction parallel to the longitudinal axis of the heater rod within the sealing space.

9. A method of assembling the fluid line of claim 1, the method comprising:
   guiding the heating rod out of the pipe and into the pipe connection of the connector;
   guiding at least one electrical connection through the at least one groove arranged in the plug; and
   guiding the heating rod out of the connector through the opening.

10. The method of claim 9, wherein the heater rod comprises at least one heating conductor embedded in a plastic molding compound to be bendable.

11. The method of claim 9, wherein the method further comprises sealing the opening with the ring seal, which bears against the heater rod.

12. The method of claim 11, further comprising positioning the ring seal against the connector from an outside of the connector.

13. The method of claim 11, wherein the method further comprises inserting the plug into the connector to hold the ring seal.

14. The method of claim 9, wherein the plug is arranged along a longitudinal axis of the pipe connection.

15. The method of claim 9, further comprising locking the plug to the connector.

16. The method of claim 9, wherein the plug further comprises:
   a locking geometry structured and arranged to lock the plug to the connector,
   wherein the at least one groove runs radially and opens into the circumferential wall of the plug outside the locking geometry.

* * * * *